(No Model.) 3 Sheets—Sheet 2.
J. W. HILL & L. D. BENNER.
METHOD OF AND MEANS FOR PLANTING CORN.
No. 529,492. Patented Nov. 20, 1894.
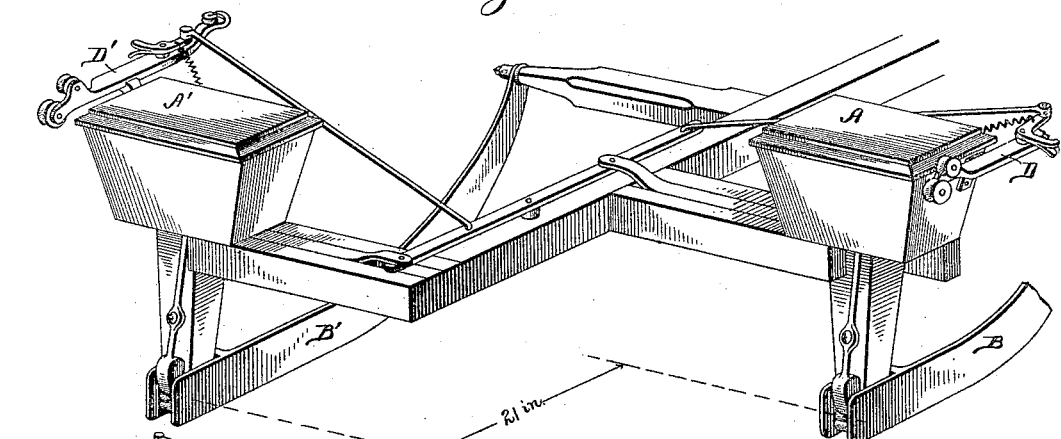
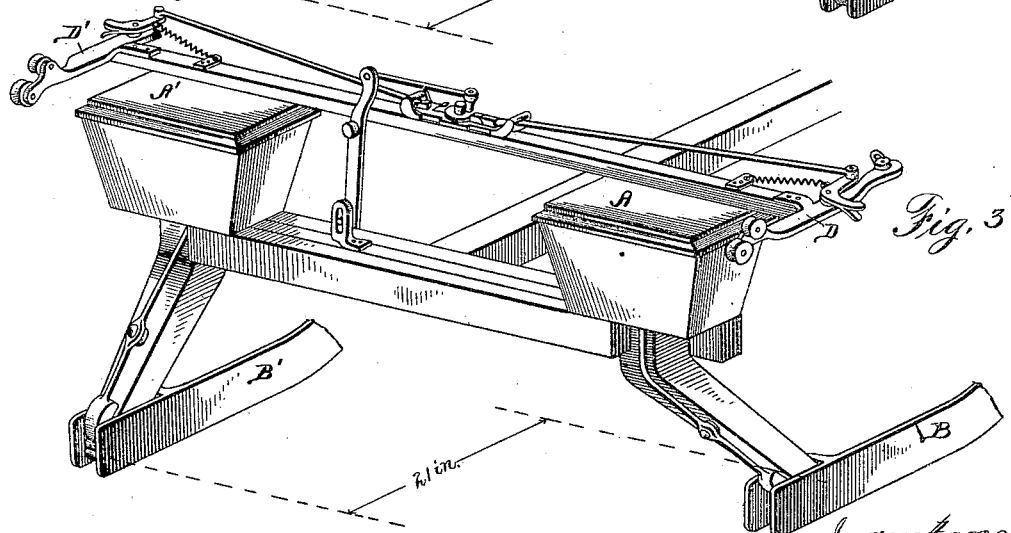

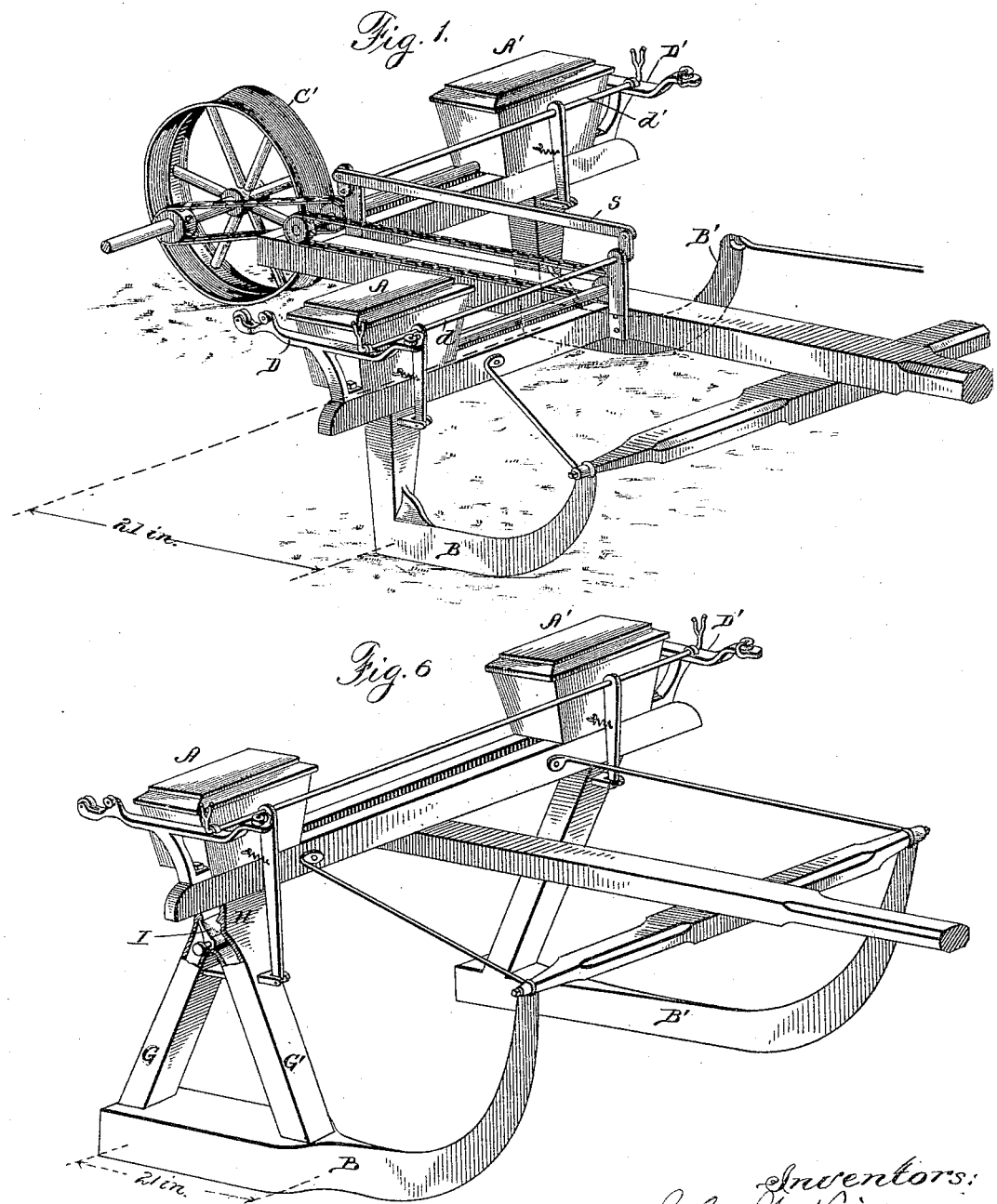

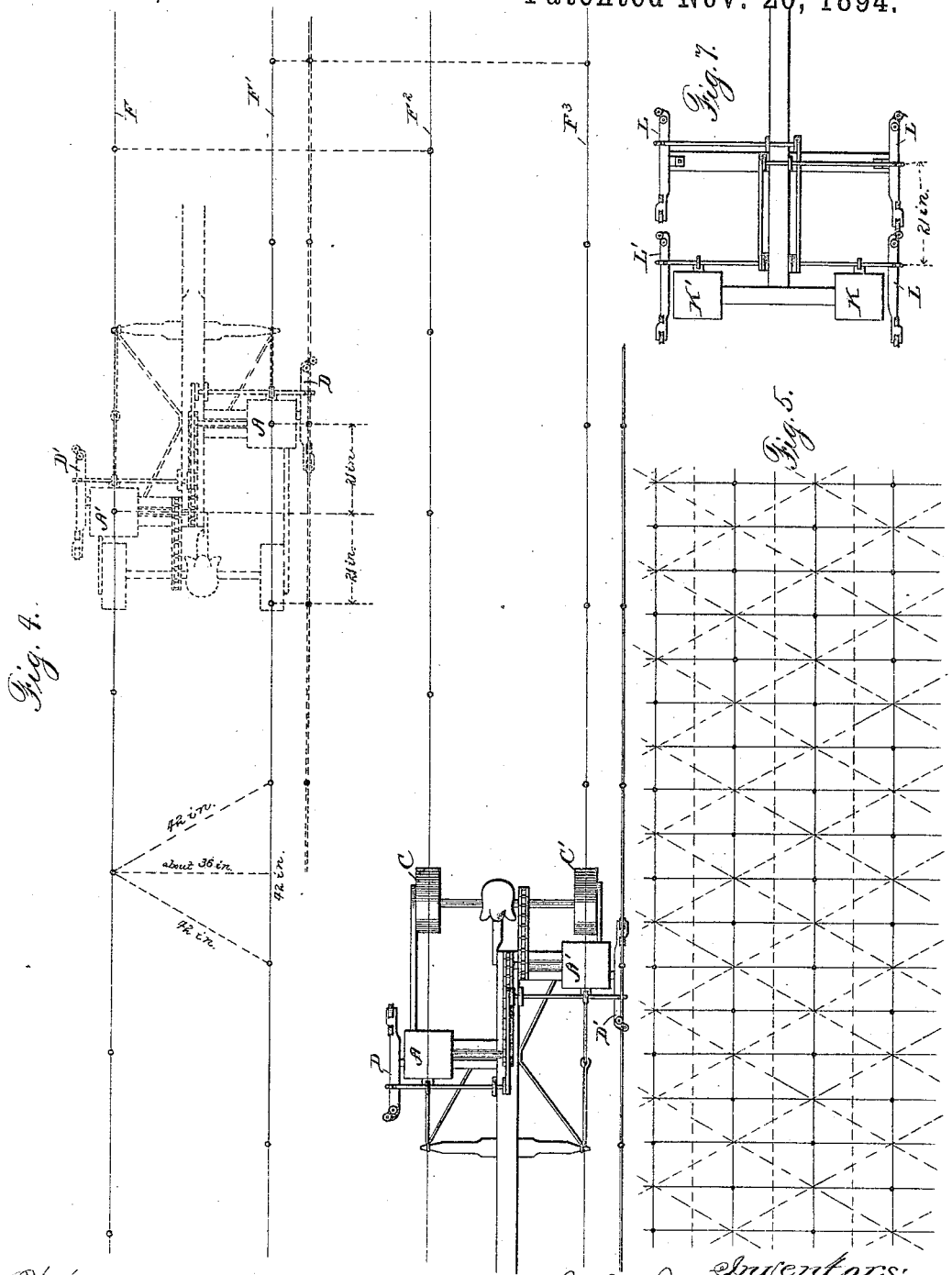

UNITED STATES PATENT OFFICE.

JOHN W. HILL, OF CHICAGO, AND LORENZO D. BENNER, OF PEORIA, ILLINOIS.

METHOD OF AND MEANS FOR PLANTING CORN.

SPECIFICATION forming part of Letters Patent No. 529,492, dated November 20, 1894.

Application filed June 1, 1894. Serial No. 513,216. (No model.)

*To all whom it may concern:*

Be it known that we, JOHN W. HILL, residing at Chicago, county of Cook, and LORENZO D. BENNER, residing at Peoria, county of Peoria, State of Illinois, citizens of the United States, have jointly invented a new and useful Method of and Means for Planting Corn and Similar Seeds, of which the following is a description.

Referring to the accompanying drawings wherein like reference letters indicate like or corresponding parts, Figure 1, is a representation, in perspective, of a portion of a corn planter embodying our invention. Figs. 2, and 3, are modifications of same. Fig. 4, is a representation of a field showing the planter passing backward and forward across the field and the manner in which our improved method of planting is accomplished. Fig. 5, represents a portion of a field planted by our improved method, and shows the different directions in which the corn can be cultivated. Fig. 6, is a modified machine adapted to plant as is now customary, or to plant in our improved way, and Fig. 7, shows a check-row device to be attached to any planter, to adapt it to plant in our improved way.

It is customary to plant corn and similar seeds by machinery in two or more rows at a time in such a manner that the hills of two rows are directly opposite to one another and the four adjacent hills throughout the field mark the angles of substantially a square or a right angle parallelogram. It will thus be seen that while the distance between the hills as marked by the sides of the square is equal (usually from thirty-six to forty-four inches, about forty-two inches being the most popular standard) and about forty-two inches, the distance across the square from one hill to that diagonally opposite is between fifty-nine and sixty inches. It will thus be seen that in the present method of planting three adjacent hills mark the points of a right angle triangle, two sides of which are, for example, forty-two inches, while the third side is nearly sixty inches, or more than forty per cent. greater, thus needlessly occupying a great amount of ground space without any corresponding advantage.

Our invention, primarily, has for its object the remedying of the above defect, by a method of planting the hills in a quincunx order, whereby a larger amount, say from ten to twenty per cent., more grain may be planted upon the same area, and yet none of the hills shall be within the prescribed distance from the next adjoining one, and the planted field may also be more easily cultivated; secondly, to point out to those skilled in the art the manner in which this method of planting may be secured in a practical way by a machine planting two or more rows at a time; thirdly, to construct a machine that may be used to plant the grain in the manner now employed, and which may also be quickly and easily changed to plant in our preferred way; and, fourthly, to construct a check-row device adapted to be attached to planters such as are now used, to adapt them to plant the seed in our improved way.

The gist of our invention rests on the fact that we plant the grain so that the hills are arranged in a quincunx order and three adjacent hills in two adjoining rows form the points of a substantially equilateral triangle, as shown in Figs. 4 and 5, the length of side being as desired, say forty-two inches. As thus planted, and assuming forty-two inches to be the desired distance between the hills, an assumption we carry out throughout this specification, the distance between the rows will be, approximately, thirty-six inches, or a gain in space of about six inches in each row, equal to a gain of one row in a little less than seven rows, or of about thirteen per cent., while at the same time the distance between the hills is maintained at forty-two inches.

In carrying out our invention, any preferred form of planter, seed-disk, check-row device and sustaining or covering wheels may be employed, as we claim nothing in this application upon any of those parts.

The desired object may be attained by arranging one side of the machine so that the seed will be deposited in advance, or in the rear of the point at which the seed is deposited upon the other side—a distance substantially equal to one-half the desired distance between the hills.

In the drawings, A, A', represent the seed-boxes of a planter, in which A, is arranged to deposit the seed, for example, twenty-one inches in advance of A'.

B, B' are the shoes or runners, of any preferred form, sustaining the boxes and directing the seed to its bed. If preferred, the shoe B', may be extended forward to prevent any tendency to a side draft; or, the rear of B may be openly extended for a similar purpose.

C, C' are covering wheels of any desired form. D, D' show one form of check-row device adapted to aid in accomplishing the desired result. As thus shown, the check-row device upon each side extends outward in a line substantially with the seed box or with the point at which the shoe allows the seed to escape. The fork, in this case, operates a rock-shaft $d$, or $d'$, the two being connected in any preferred way, as, for example, by a bar S, so that they may act in unison.

The seed disks are operated in any preferred way, and the valves operated by the check-row device may be of any desired construction and connected to and operated by said device, as preferred.

The operation of the machine described is shown in Fig. 4. As thus shown in passing across the field from left to right, the check-row device D upon the right hand of the machine is operated, and the seed in A' is deposited twenty-one inches in the rear of the seed deposited from A. On the return trip, the check-row D' upon the left side of the machine is operated and the seed in A is deposited twenty-one inches in advance of the seed in A'. The buttons upon the check line retain the same relative position at all times. Thus the hills in row F, from seed in A', dropped by the operation of D, and the hills in $F^2$, from seed in A, dropped by the operation of D', are in substantially the same line transverse to the path of the machine, which is also true of the hills in F' from seed in A, and the hills in $F^3$, from seed in A'.

Fig. 2 shows a machine of the same general construction as Fig. 1. The check-row device is different in this figure, but, as before remarked, we claim nothing upon that in this application.

Fig. 3, shows how the machine may be constructed so that the machine is not divided and the two seed boxes and the check-rower may be arranged as usual. In this form, assuming the distance between the hills to be forty-two inches, as before, the grain channel of runner B' is inclined backward ten and one-half inches while the channel of B is inclined forward an equal distance causing the seed in A to be deposited twenty-one inches in advance of the seed deposited by A'.

Fig. 6 shows one way in which a machine may be constructed so as to be adjusted to plant either in the old way or in our improved way. As thus shown, the shoe B is constructed of an extra length on the rear, and two channels, G, G', extend from the seed chute H of the box. The lower ends of the channels are arranged just one-half the distance between the hills, apart; that is to say, assuming the distance as forty-two inches between the hills, grain passing through G' will be deposited just twenty-one inches in advance of what it would be if it passed through G. A swing valve I, arranged to be locked in either position, directs the grain into the channel desired. If preferred, the rearward extension of the shoe may be enlarged to prevent dragging the seed deposited by G'. A check-rower device, such as is now common, may be used. In this form we prefer to locate the seed-boxes opposite to one another, and to give the channel the same rearward angle of inclination on both sides. Only one side will need the forwardly extending channel. We also prefer, in this form, to mount the seed-boxes somewhat higher than is customary, in order to make the channels as nearly vertical as possible. When it is desired to plant in the old way, the valve I, is operated to direct the grain into the rearward channel, but when it is desired to plant in our improved way, the valve is operated to direct the grain into the forwardly extending channel G'. No other changes are required.

Fig. 7, shows a check-row device adapted to be attached to a corn planter, and thereby to accomplish our improved method of planting. In this form, each side of the machine is operated by its own check-rower. For example, the seed from the box K is deposited by the operation of that part of the check-rower marked L, while the seed from the box K' is deposited by the operation of that part of the check-rower marked L'. The forks of the two parts of the check-rower, on each side of the machine stand twenty-one inches apart (assuming the distance between the hills to be forty-two inches) and so arranged that the button on the check-line will operate them successively. The rock-shaft shown in Fig. 1 is shown in Fig. 7, but any other check-row device giving a like result may be employed without departing from the spirit of our invention.

It is obvious that hand power, instead of a check-row device, may be employed, if preferred, to operate the valves of a corn-planter arranged to plant as described. It is also obvious that after pointing out the several ways in which the machine may be constructed to operate as described, many other ways to arrange the machine to accomplish the same result will occur to those skilled in the art. Consequently, we do not wish to be understood as limiting ourselves to the exact construction herein described, as any planting machine arranged to locate the hills in quincunx order will be within the scope of our invention.

It is also obvious that when a planter constructed to plant by the method now common is caused to drop as described by means of an attachment, such, for example, as the check-rower shown in Fig. 7, three hills of two adjoining rows will mark the points of an isosceles triangle, each of whose angles is less than a right angle, but not of an equilateral triangle unless means are provided to narrow the machine to plant the rows closer together, which is not difficult. There are still advantages, however, since the grain is much more evenly distributed over the ground, and it is much more easily cultivated, both of which produce marked effects in the quality and quantity of the crop.

As shown in Fig. 5, the cultivating may be done in three directions, thus stirring the soil on all sides of the crop, and thoroughly removing the weeds.

The method herein described has been employed for many years in planting orchards, and possibly other plants when planted singly and by hand. Hence we do not broadly claim the method of planting alone and by itself; but, so far as we know, never before has a machine, whether operated by hand or by check-row devices been adapted to space and arrange the hills in the manner herein described.

Having now described our invention, what we claim as new, and desire to secure by Letters Patent, is—

1. In a seed-planter of the corn-planter type, the runner frame, the seed-boxes supported thereon, and mechanism for discharging the seed from the boxes, in combination with means for depositing the seed on one side of the machine in advance of that on the other side, whereby the hills are located in a a quincunx order, substantially as set forth.

2. In a seed-planting machine of the corn-planter type, the runner frame, and the seed boxes supported thereon and arranged one in advance of the other, in combination with mechanism for releasing the seed from the boxes simultaneously, whereby the planted hills are located in a quincunx order, substantially as described.

3. In a seed-planting machine of the corn-planter type, the runner-frame, the seed boxes supported thereon, and mechanism for releasing the seed from the boxes simultaneously, in combination with seed-channels arranged to conduct the seed on one side of the machine to the ground in advance of that on the other side, whereby the planted hills are located in quincunx order, substantially as set forth.

4. A machine of the corn-planter type for planting corn and similar seeds, consisting of the runners, the covering device, the seed-receptacle, means for releasing the seed from the receptacles and depositing the same in hills, and means for depositing at will the seed upon one side either directly opposite the hills deposited on the other side, or in quincunx order, substantially as and for the purposes set forth.

5. A corn-planter, in combination with a check-row device, consisting of two independent parts both adapted to be operated from either side of the machine, each of which parts governs the discharge of the seed upon one side of the machine only, whereby the tappets on the check-line operate one part before the other and the seed is deposited in quincunx order, substantially as described.

6. A check-rower for corn-planters, consisting of two independent parts both adapted to be operated from either side of the machine, each of which parts governs the discharge of the seed upon one side of the machine only, whereby the tappets on the check-line operate one part before the other and the seed is deposited in quincunx order, substantially as described.

JOHN W. HILL.
LORENZO D. BENNER.

Witnesses for John W. Hill:
L. A. GARDINER,
CHAS. RAY DEAN.

Witnesses for Lorenzo D. Benner:
C. E. NIXON,
M. R. NIXON.